US012725725B2

(12) United States Patent
Gates et al.

(10) Patent No.: US 12,725,725 B2
(45) Date of Patent: Sep. 1, 2026

(54) STELLARATORS USING ARRAYS OF PERMANENT MAGNETS

(71) Applicant: THE TRUSTEES OF PRINCETON UNIVERSITY, Princeton, NJ (US)

(72) Inventors: David Gates, Princeton, NJ (US); Kenneth Hammond, Princeton, NJ (US); Caoxiang Zhu, Hefei (CN)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 220 days.

(21) Appl. No.: 18/789,978

(22) Filed: Jul. 31, 2024

(65) Prior Publication Data

US 2024/0395446 A1 Nov. 28, 2024

Related U.S. Application Data

(63) Continuation of application No. PCT/US2023/064044, filed on Mar. 9, 2023.

(60) Provisional application No. 63/319,568, filed on Mar. 14, 2022.

(51) Int. Cl.

*H01F 7/02* (2006.01)
*G21B 1/05* (2006.01)
*G21B 1/13* (2006.01)

(52) U.S. Cl.

CPC ........... *H01F 7/0273* (2013.01); *G21B 1/055* (2013.01); *G21B 1/13* (2013.01)

(58) Field of Classification Search

None

See application file for complete search history.

(56) References Cited

U.S. PATENT DOCUMENTS

| | | | | | |
|---|---|---|---|---|---|
| 3,002,912 | A * | 10/1961 | Spitzer, Jr. | G21B 1/055 | 250/493.1 |
| 3,320,478 | A * | 5/1967 | Harrison | H01J 17/14 | 313/155 |
| 4,246,067 | A * | 1/1981 | Linlor | G21B 3/006 | 376/127 |
| 5,370,765 | A * | 12/1994 | Dandl | H01J 37/32678 | 427/571 |
| 7,848,868 | B2 * | 12/2010 | Nakagawa | F02D 41/2464 | 701/99 |
| 9,822,769 | B2 * | 11/2017 | Cohen | G21B 1/052 | |
| 10,811,159 | B2 * | 10/2020 | Cohen | G21B 1/052 | |
| 11,399,425 | B2 * | 7/2022 | Howard | H05H 1/54 | |

(Continued)

FOREIGN PATENT DOCUMENTS

| | | | | |
|---|---|---|---|---|
| GB | 2609965 A * | 2/2023 | | F03G 7/10 |
| WO | WO-2023021459 A2 * | 2/2023 | | F03G 7/10 |

*Primary Examiner* — Srinivas Sathiraju

(74) *Attorney, Agent, or Firm* — Charney IP Law LLC; Thomas M. Finetti

(57) ABSTRACT

The present disclosure provides methods for defining a magnet array for a stellarator. In some embodiments, the magnet array, once defined, comprises a plurality of permanent magnets, where each permanent magnet of the plurality of permanent magnets is selected from a set of predetermined permanent magnet types. In some embodiments, each predetermined permanent magnet type in the set of predetermined permanent magnet types has a predetermined shape (geometry) and/or predetermined orientation angles (also known as a polarization orientation).

20 Claims, 6 Drawing Sheets

(56) References Cited

U.S. PATENT DOCUMENTS

| | | | | |
|---|---|---|---|---|
| 11,646,139 | B2 * | 5/2023 | Xu | H01F 7/00 376/142 |
| 12,009,111 | B2 * | 6/2024 | Gates | G21B 1/055 |
| 12,100,520 | B2 * | 9/2024 | Gates | G21B 1/055 |
| 12,340,910 | B2 * | 6/2025 | Pitcher | G21B 1/11 |
| 12,451,260 | B2 * | 10/2025 | Gates | G21B 1/055 |
| 12,537,109 | B2 * | 1/2026 | Gates | G21B 1/055 |
| 2015/0098543 | A1 * | 4/2015 | Cohen | B64G 1/408 376/131 |
| 2015/0228369 | A1 * | 8/2015 | Cohen | G21B 1/052 376/123 |
| 2017/0263337 | A1 * | 9/2017 | Pines | G21B 3/006 |
| 2020/0005958 | A9 * | 1/2020 | Cohen | H05H 1/02 |
| 2022/0151054 | A1 * | 5/2022 | Howard | H05H 1/54 |
| 2022/0208397 | A1 * | 6/2022 | Xu | H05H 1/12 |
| 2023/0059196 | A1 * | 2/2023 | Clague | H05H 1/12 |
| 2023/0107844 | A1 * | 4/2023 | Prater | H02K 44/085 310/11 |
| 2024/0206045 | A1 * | 6/2024 | Kotschenruether | H01J 37/32467 |
| 2024/0395446 | A1 * | 11/2024 | Gates | G21B 1/11 |
| 2024/0429839 | A1 * | 12/2024 | Clague | F03G 7/10 |
| 2025/0037885 | A1 * | 1/2025 | Cleeves | G21B 1/15 |

* cited by examiner

STELLARATORS USING ARRAYS OF PERMANENT MAGNETS

CROSS-REFERENCE TO RELATED APPLICATIONS

The present disclosure is a continuation of International Application No. PCT/US2023/064044 filed on Mar. 9, 2023, which applications claims the benefit of the filing date of U.S. Provisional Patent Application No. 63/319,568 filed on Mar. 14, 2022, the disclosures of each are hereby incorporated by reference herein in their entireties.

STATEMENT REGARDING FEDERALLY SPONSORED RESEARCH

This invention was made with government support under Grant Nos. DE-AC02-09CH11466 and DE-AR0001264 awarded by the Department of Energy. The government has certain rights in the invention.

BACKGROUND

Modern stellarator designs, such as W7-X and NCSX, utilize complicated electromagnetic coils in order to confine and control plasma within magnetic fields having specific characteristics. Such complicated coil designs are expensive to fabricate. While replacing some of the electromagnetic coils with permanent magnets looks promising, current approaches to designing stellarators incorporating such permanent magnets fail to achieve a viable solution, as the number of unique magnets required substantially eliminates any savings and introduces other technical issues.

A method for designing stellarator permanent magnet arrays is needed, that will allow the creation of stellarators with a reduced set of unique permanent magnet types at a reduced cost.

BRIEF SUMMARY

The present disclosure provides methods for designing a magnet array for a stellarator. Prior methods for designing stellarators using permanent magnet arrays were successful in producing a stellarator magnetic field using a simplified set of electromagnetic coils (Hammond, K. C., et al. 2020. Nuclear Fusion 60 (10): 106010). These methods, however, required each permanent magnet to be uniquely shaped and/or have a unique polarization orientation (or equivalently "magnetic dipole moment orientation angles"), requiring custom manufacture. The method disclosed herein allows for the generation of a magnet array for a stellarator using a plurality of permanent magnets selected from a set of predetermined permanent magnet types. In some embodiments, each predetermined permanent magnet type in the set of predetermined permanent magnet types has a predetermined shape (geometry) and/or predetermined orientation angles. It is believed that by selecting the permanent magnets from a set of predetermined permanent magnet types for any stellarator design allows the magnets to be manufactured in large batches and with concomitant lower costs.

A first aspect of the present disclosure is a method of defining an array of permanent magnets for a stellarator, comprising: (a) obtaining an initial arrangement of a plurality of permanent magnets positioned around a plasma having a plasma surface; (b) optimizing magnetic dipole moment magnitudes and orientation angles of each permanent magnet of the plurality of permanent magnets in the initial arrangement to provide a revised arrangement of the plurality of permanent magnets, wherein the optimization of the dipole moment magnitudes and orientation angles comprises: (i) generating an improved arrangement of the plurality of permanent magnets, wherein the improved arrangement is generated by computing a first numerical minimization of an error field on the plasma surface, where dipole moment magnitudes and orientation angles are free and continuous parameters in the computation of the first numerical minimization, and where the dipole moment magnitude is constrained from exceeding a pre-defined maximum value; (ii) generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value; (c) defining a set of allowable dipole moment orientation angles; and (d) setting the dipole moment orientation angles of each of the permanent magnets having the non-zero dipole moment magnitudes in the generated revised arrangement to one of the dipole moment orientations in the defined set of allowable dipole moment orientation angles to provide the array of permanent magnets.

In some embodiments, the first numerical minimization is selected from the group consisting of a Quasi-Newton algorithm, a gradient descent algorithm, and a Levenberg-Marquardt algorithm. In some embodiments, the second numerical minimization is selected from the group consisting of a Quasi-Newton algorithm, a gradient descent algorithm, and a Levenberg-Marquardt algorithm.

In some embodiments, the pre-defined value ranges from about 0.1 MA/m multiplied by the volume of the permanent magnet to about 10 MA/m multiplied by the volume of the permanent magnet. In some embodiments, predetermined value ranges from about 0.1 MA/m multiplied by the volume of the permanent magnet to about 10 MA/m multiplied by the volume of the permanent magnet.

In some embodiments, the method further comprises removing one or more of the permanent magnets having the zero moment magnitude. In some embodiments, the removing of the one or more magnets having the zero moment magnitude occurs prior to the setting of the dipole moment orientation angles of each of the permanent magnets having the non-zero dipole moment magnitudes. In some embodiments, the removing of the one or more magnets having the zero moment magnitude occurs after setting of the dipole moment orientation angles of each of the permanent magnets having the non-zero dipole moment magnitudes.

In some embodiments, the method further comprises replacing one or more of the permanent magnets having the zero moment magnitude with non-magnetic filler material. In some embodiments, the replacing of the one or more permanent magnets having the zero moment magnitude occurs prior to the setting of the dipole moment orientation angles of each of the permanent magnets having the non-zero dipole moment magnitudes. In some embodiments, the replacing of the one or more permanent magnets having the zero moment magnitude occurs after setting of the dipole moment orientation angles of each of the permanent magnets having the non-zero dipole moment magnitudes. In some embodiments, the non-magnetic filler material is non-conductive. In some embodiments, the non-magnetic filler material comprises one or more polymers or co-polymers. In some embodiments, the one or more polymers or co-polymers are selected from polyethylene or polypropylene.

In some embodiments, the method further comprises numerically updating the orientation angles for the error field. In some embodiments, the error field is numerically updated using a nonlinear integer programming algorithm.

In some embodiments, the method further comprises storing any one of initial arrangements, improved arrangements, or revised arrangements in a non-transitory storage medium.

A second aspect of the present disclosure is a magnet array for a stellarator, wherein the magnet array comprises a plurality of permanent magnets and wherein the magnet array is designed using a method comprising: (a) obtaining an initial arrangement of a plurality of permanent magnets positioned around a plasma having a plasma surface; (b) optimizing magnetic dipole moment magnitudes and orientation angles of each permanent magnet of the plurality of permanent magnets in the initial arrangement to provide a revised arrangement of the plurality of permanent magnets, wherein the optimization of the dipole moment magnitudes and orientation angles comprises: (i) generating an improved arrangement of the plurality of permanent magnets, wherein the improved arrangement is generated by computing a first numerical minimization of an error field on the plasma surface, where dipole moment magnitudes and orientation angles are free and continuous parameters in the computation of the first numerical minimization, and where the dipole moment magnitude is constrained from exceeding a pre-defined maximum value; (ii) generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value; (c) defining a set of allowable dipole moment orientation angles; and (d) setting the dipole moment orientation angles of each of the permanent magnets having the non-zero dipole moment magnitudes in the generated revised arrangement to one of the dipole moment orientations in the defined set of allowable dipole moment orientation angles to provide the array of permanent magnets.

In some embodiments, each permanent magnet of the plurality of permanent magnets is selected from a set of predetermined permanent magnet types. In some embodiments, a number of different permanent magnet types in the set of predetermined permanent magnet types is less than the total number of permanent magnets in the magnet array.

In some embodiments, a number of different permanent magnet types in the set of predetermined permanent magnet types ranges from 1 to 6, e.g., 6, 5, 4, 3, 2, or 1 permanent magnet types. In some embodiments, each predetermined permanent magnet type in the set of predetermined permanent magnet types has a predetermined shape and/or predetermined orientation angles.

In some embodiments, the first numerical minimization is selected from the group consisting of a Quasi-Newton algorithm, a gradient descent algorithm, and a Levenberg-Marquardt algorithm. In some embodiments, the second numerical minimization is selected from the group consisting of a Quasi-Newton algorithm, a gradient descent algorithm, and a Levenberg-Marquardt algorithm.

In some embodiments, the pre-defined value ranges from about 0.1 MA/m multiplied by the volume of the permanent magnet to about 10 MA/m multiplied by the volume of the permanent magnet. In some embodiments, predetermined value ranges from about 0.1 MA/m multiplied by the volume of the permanent magnet to about 10 MA/m multiplied by the volume of the permanent magnet.

In some embodiments, the method further comprises removing one or more of the permanent magnets having the zero moment magnitude. In some embodiments, the removing of the one or more magnets having the zero moment magnitude occurs prior to the setting of the dipole moment orientation angles of each of the permanent magnets having the non-zero dipole moment magnitudes. In some embodiments, the removing of the one or more magnets having the zero moment magnitude occurs after setting of the dipole moment orientation angles of each of the permanent magnets having the non-zero dipole moment magnitudes.

In some embodiments, the method further comprises replacing one or more of the permanent magnets having the zero moment magnitude with non-magnetic filler material. In some embodiments, the replacing of the one or more permanent magnets having the zero moment magnitude occurs prior to the setting of the dipole moment orientation angles of each of the permanent magnets having the non-zero dipole moment magnitudes. In some embodiments, the replacing of the one or more permanent magnets having the zero moment magnitude occurs after setting of the dipole moment orientation angles of each of the permanent magnets having the non-zero dipole moment magnitudes. In some embodiments, the non-magnetic filler material is non-conductive. In some embodiments, the non-magnetic filler material comprises one or more polymers or co-polymers. In some embodiments, the one or more polymers or co-polymers are selected from polyethylene or polypropylene.

In some embodiments, the method further comprises numerically updating the orientation angles for the error field. In some embodiments, the error field is numerically updated using a nonlinear integer programming algorithm.

In some embodiments, the method further comprises storing any one of initial arrangements, improved arrangements, or revised arrangements in a non-transitory storage medium.

A third aspect of the present disclosure is a non-transitory computer-readable medium storing instructions for defining an array of permanent magnets for a stellarator, comprising: obtaining an initial arrangement of a plurality of permanent magnets positioned around a plasma having a plasma surface; optimizing dipole moment magnitudes and dipole moment orientation angles of each permanent magnet of the plurality of permanent magnets in the initial arrangement to provide a revised arrangement of the plurality of permanent magnets, wherein the optimization of the dipole moment magnitudes and dipole moment orientation angles comprises: generating an improved arrangement of the plurality of permanent magnets, wherein the improved arrangement is generated by computing a first numerical minimization of an error field on the plasma surface, where dipole moment magnitudes and dipole moment orientation angles are free and continuous parameters in the computation of the first numerical minimization, and where the dipole moment magnitude is constrained from exceeding a pre-defined maximum value, generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value; defining a set of allowable dipole moment orientation angles; and setting the dipole moment orientation angles of each of the permanent magnets having the non-zero dipole moment magnitudes in the generated revised arrangement to one of the dipole moment orientation angles in the defined set of allowable dipole moment orientation angles to provide the array of permanent magnets.

In some embodiments, the first numerical minimization is selected from the group consisting of a Quasi-Newton algorithm, a gradient descent algorithm, and a Levenberg-Marquardt algorithm. In some embodiments, the second numerical minimization is selected from the group consisting of a Quasi-Newton algorithm, a gradient descent algorithm, and a Levenberg-Marquardt algorithm.

In some embodiments, the pre-defined value ranges from about 0.1 MA/m multiplied by the volume of the permanent magnet to about 10 MA/m multiplied by the volume of the permanent magnet. In some embodiments, the predetermined value ranges from about 0.1 MA/m multiplied by the volume of the permanent magnet to about 10 MA/m multiplied by the volume of the permanent magnet.

In some embodiments, the non-transitory computer readable medium further includes instructions for removing one or more of the permanent magnets having the zero moment magnitude.

In some embodiments, the removing of the one or more magnets having the zero moment magnitude occurs prior to the setting of the dipole moment orientation angles of each of the permanent magnets having the non-zero dipole moment magnitudes. In some embodiments, the removing of the one or more magnets having the zero moment magnitude occurs after setting of the dipole moment orientation angles of each of the permanent magnets having the non-zero dipole moment magnitudes.

In some embodiments, the non-transitory computer readable medium further includes replacing one or more of the permanent magnets having the zero moment magnitude with non-magnetic filler material. In some embodiments, the replacing of the one or more permanent magnets having the zero moment magnitude occurs prior to the setting of the dipole moment orientation angles of each of the permanent magnets having the non-zero dipole moment magnitudes. In some embodiments, the replacing of the one or more permanent magnets having the zero moment magnitude occurs after setting of the dipole moment orientation angles of each of the permanent magnets having the non-zero dipole moment magnitudes. In some embodiments, the non-magnetic filler material is non-conductive. In some embodiments, the non-magnetic filler material comprises one or more polymers or co-polymers. In some embodiments, the one or more polymers or co-polymers are selected from polyethylene or polypropylene.

In some embodiments, the non-transitory computer readable medium further includes numerically updating the orientation angles for the error field. In some embodiments, the error field is numerically updated using a nonlinear integer programming algorithm.

In some embodiments, the non-transitory computer readable medium further includes storing any one of initial arrangements, improved arrangements, or revised arrangements in a non-transitory storage medium.

A fourth aspect of the present disclosure is a system for defining an array of permanent magnets for a stellarator, the system comprising: (i) one or more processors, and (ii) one or more memories coupled to the one or more processors, the one or more memories to store computer-executable instructions that, when executed by the one or more processors, cause the system to perform operations comprising: obtaining an initial arrangement of a plurality of permanent magnets positioned around a plasma having a plasma surface; optimizing dipole moment magnitudes and dipole moment orientation angles of each permanent magnet of the plurality of permanent magnets in the initial arrangement to provide a revised arrangement of the plurality of permanent magnets, wherein the optimization of the dipole moment magnitudes and dipole moment orientation angles comprises: generating an improved arrangement of the plurality of permanent magnets, wherein the improved arrangement is generated by computing a first numerical minimization of an error field on the plasma surface, where dipole moment magnitudes and dipole moment orientation angles are free and continuous parameters in the computation of the first numerical minimization, and where the dipole moment magnitude is constrained from exceeding a pre-defined maximum value, generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value; defining a set of allowable dipole moment orientation angles; and setting the dipole moment orientation angles of each of the permanent magnets having the non-zero dipole moment magnitudes in the generated revised arrangement to one of the dipole moment orientation angles in the defined set of allowable dipole moment orientation angles to provide the array of permanent magnets.

In some embodiments, the first numerical minimization is selected from the group consisting of a Quasi-Newton algorithm, a gradient descent algorithm, and a Levenberg-Marquardt algorithm. In some embodiments, the second numerical minimization is selected from the group consisting of a Quasi-Newton algorithm, a gradient descent algorithm, and a Levenberg-Marquardt algorithm. In some embodiments, the pre-defined value ranges from about 0.1 MA/m multiplied by the volume of the permanent magnet to about 10 MA/m multiplied by the volume of the permanent magnet. In some embodiments, the predetermined value ranges from about 0.1 MA/m multiplied by the volume of the permanent magnet to about 10 MA/m multiplied by the volume of the permanent magnet.

In some embodiments, the system further comprises removing one or more of the permanent magnets having the zero moment magnitude. In some embodiments, the removing of the one or more magnets having the zero moment magnitude occurs prior to the setting of the dipole moment orientation angles of each of the permanent magnets having the non-zero dipole moment magnitudes. In some embodiments, the removing of the one or more magnets having the zero moment magnitude occurs after setting of the dipole moment orientation angles of each of the permanent magnets having the non-zero dipole moment magnitudes.

In some embodiments, the system further comprises replacing one or more of the permanent magnets having the zero moment magnitude with non-magnetic filler material. In some embodiments, the replacing of the one or more permanent magnets having the zero moment magnitude occurs prior to the setting of the dipole moment orientation angles of each of the permanent magnets having the non-zero dipole moment magnitudes. In some embodiments, the replacing of the one or more permanent magnets having the zero moment magnitude occurs after setting of the dipole moment orientation angles of each of the permanent magnets having the non-zero dipole moment magnitudes. In some embodiments, the non-magnetic filler material is non-conductive. In some embodiments, the non-magnetic filler material comprises one or more polymers or co-polymers. In some embodiments, the one or more polymers or co-polymers are selected from polyethylene or polypropylene.

In some embodiments, the system further comprises numerically updating the orientation angles for the error field. In some embodiments, the error field is numerically updated using a nonlinear integer programming algorithm.

In some embodiments, the system further comprises storing any one of initial arrangements, improved arrangements, or revised arrangements in a non-transitory storage medium.

DETAILED DESCRIPTION

Figure 1A:
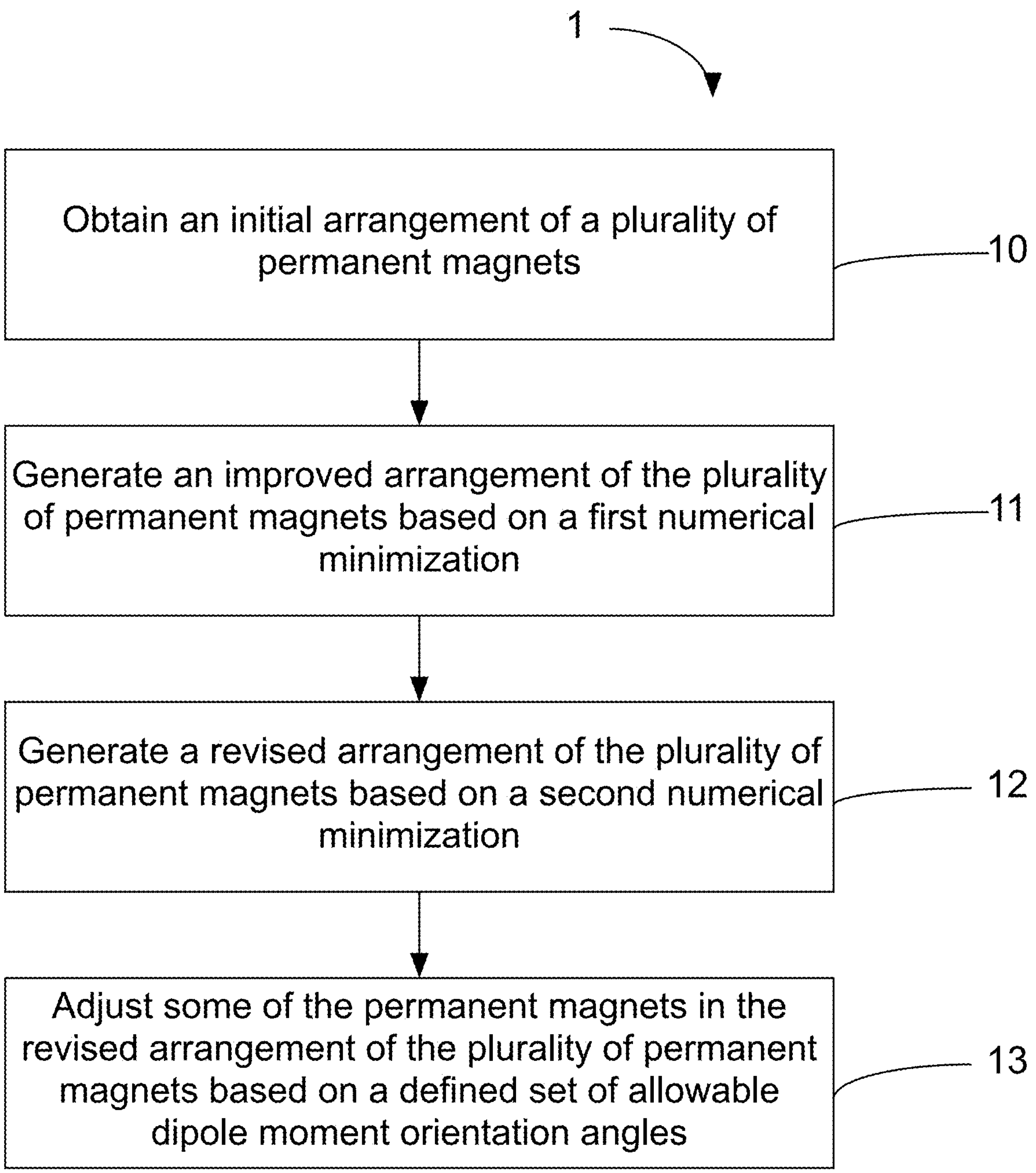
FIG. 1A sets forth a flowchart illustrating a method of iteratively defining an array of permanent magnets for a stellarator, where the permanent magnets define a field adapted to confine a plasma in accordance with one embodiment of the present disclosure.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b, and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present disclosure provides methods for defining a magnet array for a stellarator. In some embodiments, the magnet array, once defined, comprises a plurality of permanent magnets, where each permanent magnet of the plurality of permanent magnets is selected from a set of predetermined permanent magnet types. In some embodiments, the set of predetermined permanent magnet types includes between 1 and 20 different predetermined permanent magnet types, such as between 2 and 10 different predetermined permanent magnet types, such as between 2 and 6 different predetermined permanent magnet types, such as 6 different predetermined permanent magnet types, such as 5 different predetermined permanent magnet types, such as 4 different predetermined permanent magnet types, such as 3 different predetermined permanent magnet types, or such as 2 different predetermined permanent magnet types. In some embodiments, each predetermined permanent magnet type in the set of predetermined permanent magnet types has a predetermined shape (geometry) and/or predetermined orientation angles (also known as a polarization orientation). It is believed that by selecting the permanent magnets from the set of predetermined permanent magnet types for any stellarator design allows the magnets to be manufactured in large batches and with concomitant lower costs; and allows the assembly procedure to select magnets from sets of identical magnets rather than individual custom magnets.

In some embodiments, each predetermined permanent magnet type in the set of predetermined permanent magnet types have defined orientation angles, where the defined orientation angles may be selected form between 1 and 6 different pairs of orientation angles (of which each pair defines a polarization direction/orientation). For example, and with reference to FIG. 2, in some embodiments, each permanent magnet may be initially defined as having an on-plane polarization, such as a "face" polarization 230 (where the orientation is normal to a face) or a "face-edge" polarization 232 (where the orientation is rotated along an axis (e.g., the x-, y-, or z-axis) toward an edge of the cube at an angle (θfe) from a "face" orientation 230) or an off-plane polarization (such as "face-corner" polarization 234 (where the orientation is rotated along two axes (e.g., the x- and y-axis) towards a corner of the cube at an angle (θfc) from a "face" orientation 230).

Figure 2:
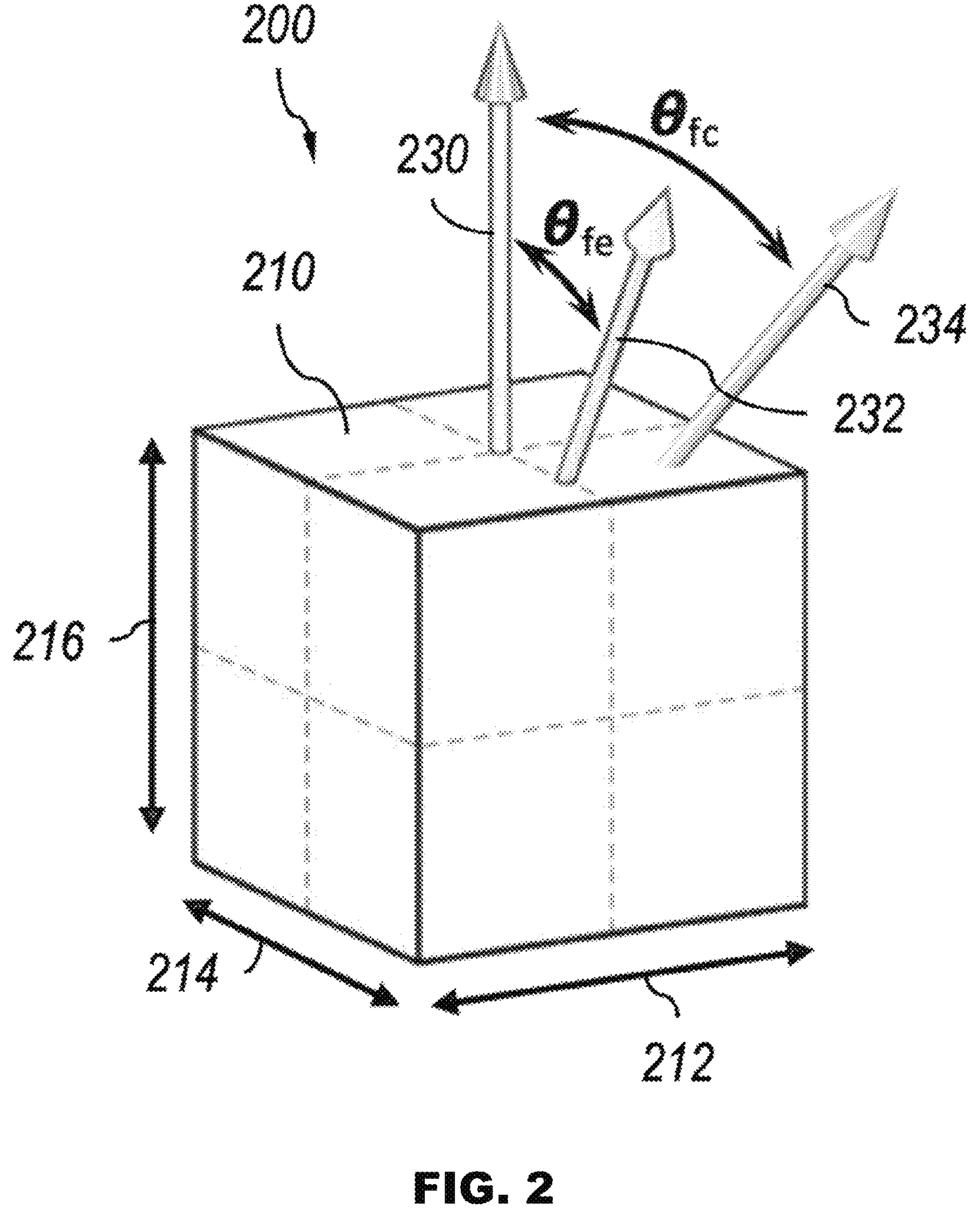
FIG. 2 is a schematic illustration of a magnet and polarization configuration types.

As noted above, an example of a permanent magnet polarization configuration is shown in FIG. 2. For instance, permanent magnet 200 is shown as having a magnet body 210 that is cubic in shape. Alternatively, the shape of the permanent magnet may be rectangular, trapezoidal, or some other regular geometric shape (not depicted). In some embodiments, at least one dimension of the permanent magnet (e.g., length 212 defining an x-axis, width 214 defining a y-axis, and/or height 216 defining a z-axis) is between about 0.5 and about 6 inches, such as between about 0.5 inches and about 5 inches, such as between about 1 inch and about 5 inches, such as between about 1.5 inches and about 5 inches, such as between about 1.5 inches and about 4.5 inches, such as between about 2 inches and about 4 inches, such as between about 1 inch and about 3.5 inches, such as between about 1 inch and about 3 inches, such as between about 0.5 inches and about 3.5 inches, and such as between about 0.5 inches and about 3 inches. In some embodiments, the magnets may have a geometric shape that allows for their volumetric tessellation such that the plurality of permanent magnets in any defined magnet array are capable of being volumetrically tessellated with substantially no space between any adjacent surfaces of adjacent permanent magnets of the plurality of permanent magnets (where at least about 90% of the volume is occupied by the plurality of permanent magnets).

In some embodiments, the methods of the present disclosure provide for an iterative approach to defining a magnet array adapted to confine a plasma. With reference to FIG. 1A, in some embodiments, the iterative method 1 comprises obtaining an initial arrangement of a plurality of permanent magnets (step 10). In some embodiments, the initial arrangement does not include any predetermined permanent magnet types. Subsequently, a first numerical minimization is performed whereby an improved arrangement of the plurality of permanent magnets is generated (step 11), i.e., the initial arrangement is improved using a first numerical minimization to provide an improved arrangement. Next, a second numerical minimization is performed whereby a revised arrangement of the plurality of permanent magnets is generated, and where the improved arrangement of the plurality of permanent magnets (from step 11) is used as a starting point for the second numerical minimization (step 12), i.e., the improved arrangement is revised using a second numerical minimization to provide a revised arrangement. Following the generation of the revised arrangement, some of the permanent magnets in the revised arrangement are adjusted (i.e., their physical properties are adjusted), namely those permanent magnets determined as a result of the second numerical minimization to have a non-zero dipole moment magnitude (step 13). This adjustment utilizes a defined set of allowable dipole moment orientation angles. The adjusted revised arrangement of permanent magnets defines an array of permanent magnets for a stellarator, such that a plasma may be confined within a void defined by the stellarator or a component or subsystem thereof. The method depicted in FIG. 1A may include yet further permanent magnet optimizations to further refine any defined permanent magnet arrangement, thereby further refining the field generated to confine the plasma.

Figure 1B:
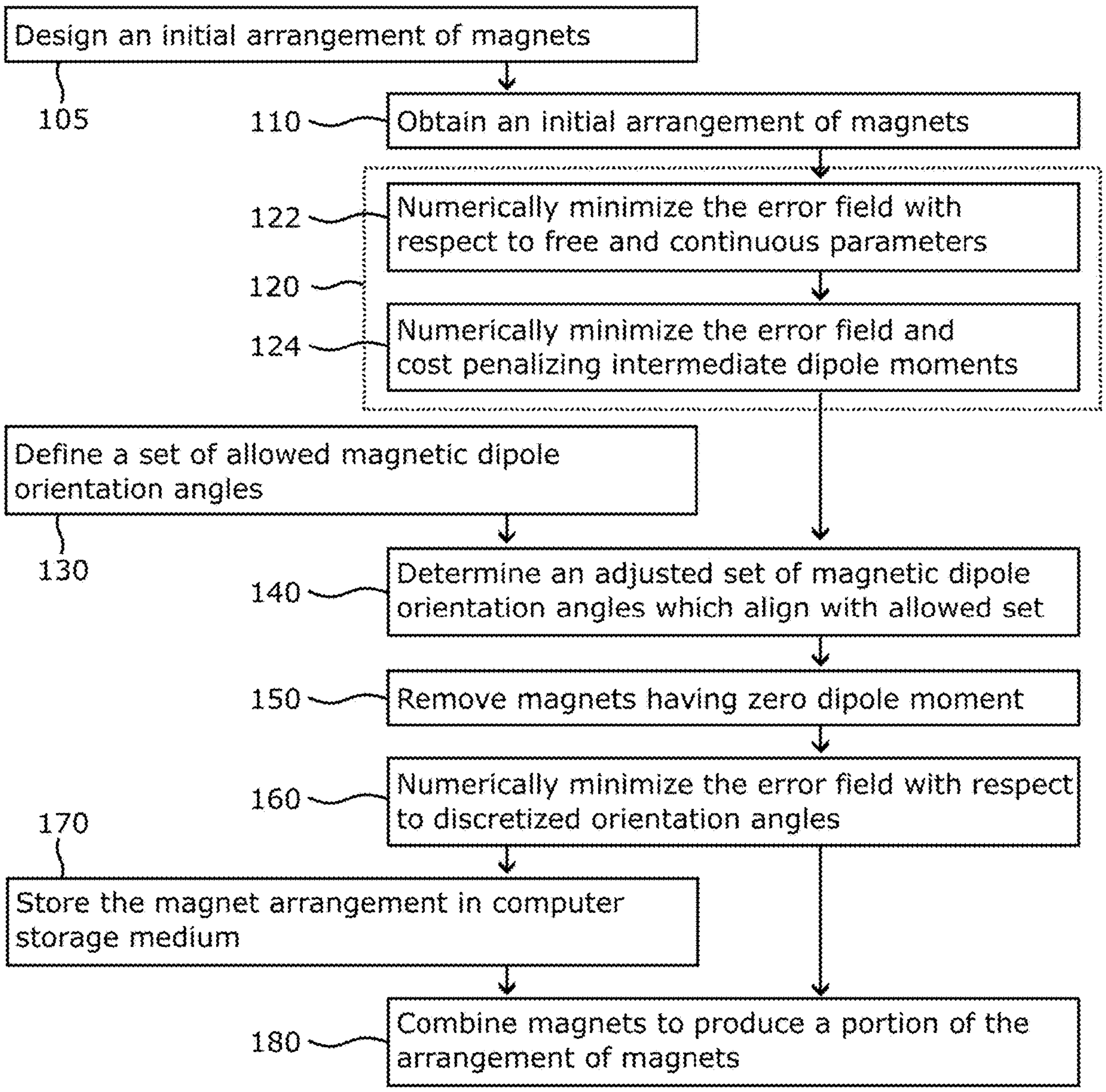
FIG. 1B sets forth a flowchart illustrating a method of iteratively defining an array of permanent magnets for a stellarator, where the permanent magnets define a field adapted to confine a plasma in accordance with one embodiment of the present disclosure.

With reference to FIG. 1B, the method of the present disclosure first comprises obtaining an initial arrangement of a plurality of permanent magnets (step 110) positioned around a theoretical stellarator plasma having a plasma surface. By way of example, Hammond et al. (2020) describe two algorithms for the initial arrangement of magnets (Hammond, K. C., et al. 2020. Nuclear Fusion 60 (10): 106010). Both describe permanent magnets filling a volume whose inner surface is some distance from the plasma surface, and with some thickness in the normal direction. One describes filling the volume with quadrilateral-faced hexahedra, and the other describes filling the volume with identical cubes. Zhu et al. (2020) describes another algorithm for generating this initial distribution (Zhu, Caoxiang, et al. 2020. Nuclear Fusion 60 (7): 076016).

In some embodiments, the initial arrangement of the plurality of permanent magnets includes between about 1,000 and about 1,000,000 permanent magnets. In other embodiments, the initial arrangement of the plurality of permanent magnets includes between about 1,000 and about 100,000 permanent magnets. In yet other embodiments, the initial arrangement of the plurality of permanent magnets includes between about 10,000 and about 1,000,000 permanent magnets. In further embodiments, the initial arrangement of the plurality of permanent magnets includes between about 10,000 and about 100,000 permanent magnets.

In some embodiments, the method may include an upstream step of designing the theoretical geometric arrangement of the plurality of magnets (step 105).

After obtaining the initial arrangement of the permanent magnets (step 110), the dipole moment magnitudes and dipole moment orientation angles of each permanent magnet of the plurality of permanent magnets in the initial arrangement are optimized to provide a revised arrangement of the plurality of permanent magnets (step 120). In some embodiments, the optimization comprises a two-step approach. In some embodiments, the revised arrangement defines a field is suitable to confine a plasma within a void defined by a stellarator or a component of a stellarator.

A first step of the optimization (step 120) involves generating an improved arrangement of the plurality of permanent magnets (step 122). Said another way, a first step involves improving upon the initial arrangement of the plurality of permanent magnets to provide the improved arrangement of the plurality of permanent magnets. In some embodiments, the method comprises performing a first numerical minimization of an error field on a plasma surface where dipole moment magnitudes and dipole moment orientation angles are free and continuous parameters in the computation of the first numerical minimization. As used herein, the term "error field" refers to the component of the produced magnetic field which is normal to the plasma boundary. Non-limiting examples of suitable numerical minimization algorithms include Quasi-Newton algorithms, gradient descent algorithms, and the Levenberg-Marquardt algorithm. In some embodiments, the dipole moment magnitude is constrained in the first numerical minimization from exceeding a pre-defined maximum value. In some embodiments, the pre-defined maximum value may be different for each permanent magnet. In some embodiments, the pre-defined maximum value for each permanent magnet may be proportional to the volume of that magnet. By way of example, a maximum magnetic moment magnitude may be a magnetization density (for example about 1.1 MA/m, typically between 0.1 and 10 MA/m for different advanced magnetic materials) multiplied by the volume of one of the permanent magnets of the plurality of permanent magnets. In some embodiments, the produced error field should be as low as possible. By way of example, the root-mean-square of the error field (with the mean taken over surface area) might be less than about 0.5% of the average magnetic field. It is believed that a smaller error field confines a plasma better. The output of step 122 is an improved arrangement of magnets having continuous, and generally unique, magnetic dipole moment magnitudes and dipole moment orientation angles.

In some embodiments, optimization (step 120) further comprises using the generated improved arrangement (step 122) as an initialization (i.e., an algorithm starting point); and then performing a second numerical minimization of a composite cost function that penalizes both error field on the plasma surface and intermediate dipole moment magnitudes (step 124). The second numerical minimization yields a revised permanent magnet arrangement (i.e., a revision of the improved arrangement) in which every permanent magnet has a dipole moment magnitude of either zero or a predetermined value. In some embodiments, the predetermined value may be different for each permanent magnet. In some embodiments, the predetermined value for each permanent magnet may be proportional to the volume of that magnet. In some embodiments, the predetermined value may represent the maximum attainable remanence in currently available permanent magnets, for example about 1.1 MA/m, multiplied by the volume of that permanent magnet. This value is a practical maximum for the amount of magnetization achievable by a permanent magnet with having a predetermined volume. Permanent magnets may have different volumes. By way of example, a permanent magnet may have a volume of about 10 cubic centimeters. By way of example, a permanent magnet may have a volume of about 500 cubic centimeters.

Non-limiting examples of suitable numerical minimization algorithms include Quasi-Newton algorithms, gradient descent algorithms, and the Levenberg-Marquardt algorithm. An example of a composite cost function that penalizes two quantities is the linear addition of the two quantities, such as "A+B" penalizes both A and B. An example of a cost function which penalizes intermediate dipole moment magnitudes is the sum of N downward-curvature parabolae, each a function of one magnet's dipole moment magnitude, with roots at zero and the maximum dipole moment magnitude, where N is the number of permanent magnets. The output of step 124 is a revised arrangement of permanent magnets where each permanent magnet in the plurality of permanent magnets in the revised arrangement has a magnetic dipole moment magnitude of either zero or the second user-defined value, and where the plurality of permanent magnets have continuous and generally unique orientation angles.

In some embodiments, method 100 further includes the step of defining a set of allowable dipole moment orientation angles (step 130). For example, if an initial set of magnet polarization types included three different polarization types for a cubic magnet (see, e.g., FIG. 2), one normal to a face ("face"), one angled towards and edge ("face-edge"), and one angled towards the corner ("face-corner"), the set of allowable orientations defined in 130 would include all 54 possible rotations of the initial set (6 of the "face" polarization, and 24 each of the "face-edge" and "face-corner" polarization types). The output of step 130 is a set of allowable dipole moment orientation angles.

The method 100 further includes the step of setting the dipole moment orientation angles (step 140) of each of the permanent magnets having the non-zero dipole moment magnitudes in the generated revised arrangement to one of the dipole moment orientation angles in the defined set of allowable dipole moment orientation angles (from step 130) to provide the array of permanent magnets. By way of example, the dipole moment orientation angles may be adjusted to the nearest dipole moment orientation within the set of allowable dipole moment orientation angles. To expand upon this example, if the allowable orientation angles correspond to orientations lying upon the x, y, and z Cartesian axes, and the azimuthal and polar angles of a permanent magnet's dipole orientation are about 10° and about 80° respectively in the revised arrangement, this permanent magnet's dipole orientation azimuthal and polar angles would be set to about 0° and about 90° respectively, corresponding to the Cartesian x axis. Another example is to adjust the orientation angles of each permanent magnet to the orientation angles in the set of allowable dipole moment orientation angles which minimizes the error field. The output of step 140 is a defined array of permanent magnets having magnetic moment amplitudes which are either zero or the predetermined value (from step 124), and orientation angles which are derived from the allowable set of dipole moment orientation angles.

In some embodiments, the method 100 may further include modifying the defined array of permanent magnets by removing a magnet having a zero moment magnitude and/or replacing a magnet having a zero moment magnitude with a non-magnetic filler material (step 150). As noted herein, and as a result of the second numerical minimalization, some of the permanent magnets in the defined array of permanent magnets have a zero magnetic dipole moment. Step 150 comprises selecting these permanent magnets and either removing them or replacing them with non-magnetic filler material.

In some embodiments, the non-magnetic filler material is non-conductive. In some embodiments, the non-magnetic filler material is a polymer or copolymer. In some embodiments, the polymer or copolymer is selected from polyethylenes, polypropylenes, polybutylenes, low vinyl polybutadienes (predominantly 1,3 addition), high vinyl polybutadienes (significant 1,2 addition), polystyrenes, butadiene-styrene copolymers, SMA polymers, ABS polymers, polydicyclopentadienes, epoxies, polyurethanes, cyanate esters, poly (phenylene oxide), EPDM polymers, cyclic olefin copolymers (COC), polyimides, bismaleimides, phosphazenes, olefin-modified phosphazenes, acrylates, vinyl esters, polylactones, polycarbonates, polysulfones, polythioethers, polyetheretherketones (PEEK), polydimethylsiloxanes (PDMS), polyethylenc terephthalates (PET), polybutylene terephthalates (PBT), and other commercially-available polymers. In some other embodiments, the second component is selected from the group consisting of styrene, divinylbenzene, 1,2-bis(vinylphenyl) ethane, vinylbenzyl ether compounds, vinyl ether compounds, allyl cther compounds, vinylphenyl monomers, vinyl monomers, allyl monomers, or derivatives of such components. Suitable components include, but are not limited to, vinyl-functionalized cyanate ester HTL-300 (available from Lonza Chemicals), low- and high-vinyl Ricon polybutadienes (Total/Cray Valley), butadiene-styrene Ricon copolymers (Total/Cray Valley), Sartomer acrylate monomers (Arkema), olefin-containing phosphazene SPV-100 (Otsuka Chemicals), bismaleimide BMPI-300 (Lonza Chemicals), bismaleimide Cycom 5250 (Cytec Solvay), bismaleimide BMI-1700 (Designer Molecules Inc.), bismaleimide BMI-3000 (Designer Molecules, Inc.), bismaleimide BMI-689 (Designer Molecules, Inc.), bismaleimide Homide 250 (HOS-Technik GmbH), bismaleimide BMI-2300 (Daiwakaskei Industry Co., LTD), bismaleimide BMI-TMH (Daiwakaskci Industry Co., LTD), bismaleimide Compimide 353A (Evonik), bismaleimide Compimide C796 (Evonik), methacrylate-functionalized polyphenylene ether SA9000 (Sabic, Saudi Basic Industries Corporation), functionalized phenylene ether oligomers OPE-2EA and OPE-2St (MGC, Mitsubishi Gas Company), polyimide PETI 330 (UBE Industries, Ltd), Vinyl-ester resins Advalite 35070-00 (Reichhold), epoxy resins Celloxide 8000 and Celloxide 2021P (Daicel) or Araldite MY 721 and GY 281 and GY 240 (Huntsman). In some embodiments, the non-magnetic filler material is polyethylene or polypropylene.

The output of step 150 is a modified defined array including permanent magnets and non-magnetic filler material, of which the permanent magnets have magnetic moment amplitudes which are the predetermined value (from step 124), and orientation angles which are derived from the set of allowable dipole moment orientation angles. In some embodiments, step 150 may occur prior to step 140.

The method may also include numerically updating the adjusted set of orientation angles for the error field using a nonlinear integer programming algorithm in which each dipole moment can vary discretely between its respective allowable orientations in the expanded set of allowable orientations (step 160). Examples of appropriate optimization algorithms and/or nonlinear integer programming algorithms include genetic algorithms, and several so-called Mixed Integer Non-Linear Programming listed in a recent review from Sahinidis (Sahinidis, Nikolaos V. 2019. Optimization and Engineering 20 (2): 301-6). The output of step 160 is an arrangement of permanent magnets and non-magnetic filler material, of which the permanent magnets have magnetic moment amplitudes which are the predetermined values (from step 124), and orientation angles which are one of the set of allowable dipole moment orientation angles, which produces a lower error field than the output of step 150. In some embodiments, step 160 may occur prior to step 150.

The method may also include storing any of the defined permanent magnet arrays and/or permanent magnet arrangements from any of the steps noted herein in a non-transitory computer readable storage medium (step 170). The step of storing 170 may additionally or alternatively include storing the defined set of allowable dipole moment orientation angles generated at step 130.

The method may also include combining a plurality of magnets to produce at least a portion of the improved magnet arrangement with the adjusted set of orientations (step 180).

In some embodiments, a system for designing stellarator magnet arrays may be provided. The system will generally include a processor and a non-transitory computer readable storage medium containing instructions that, when executed, cause the processor to execute instructions to perform any of the method steps recited herein. The system may be configured to display at least a portion of the design on a display device or otherwise output (e.g., print) at least a portion of the design.

Another aspect the present disclosure is a stellarator comprising a plurality of shaping units, where each shaping unit comprises a plurality of permanent magnets, where each permanent magnet of the plurality of magnets has a permanent magnet arrangement defined in accordance with the methods described herein.

Figure 3:
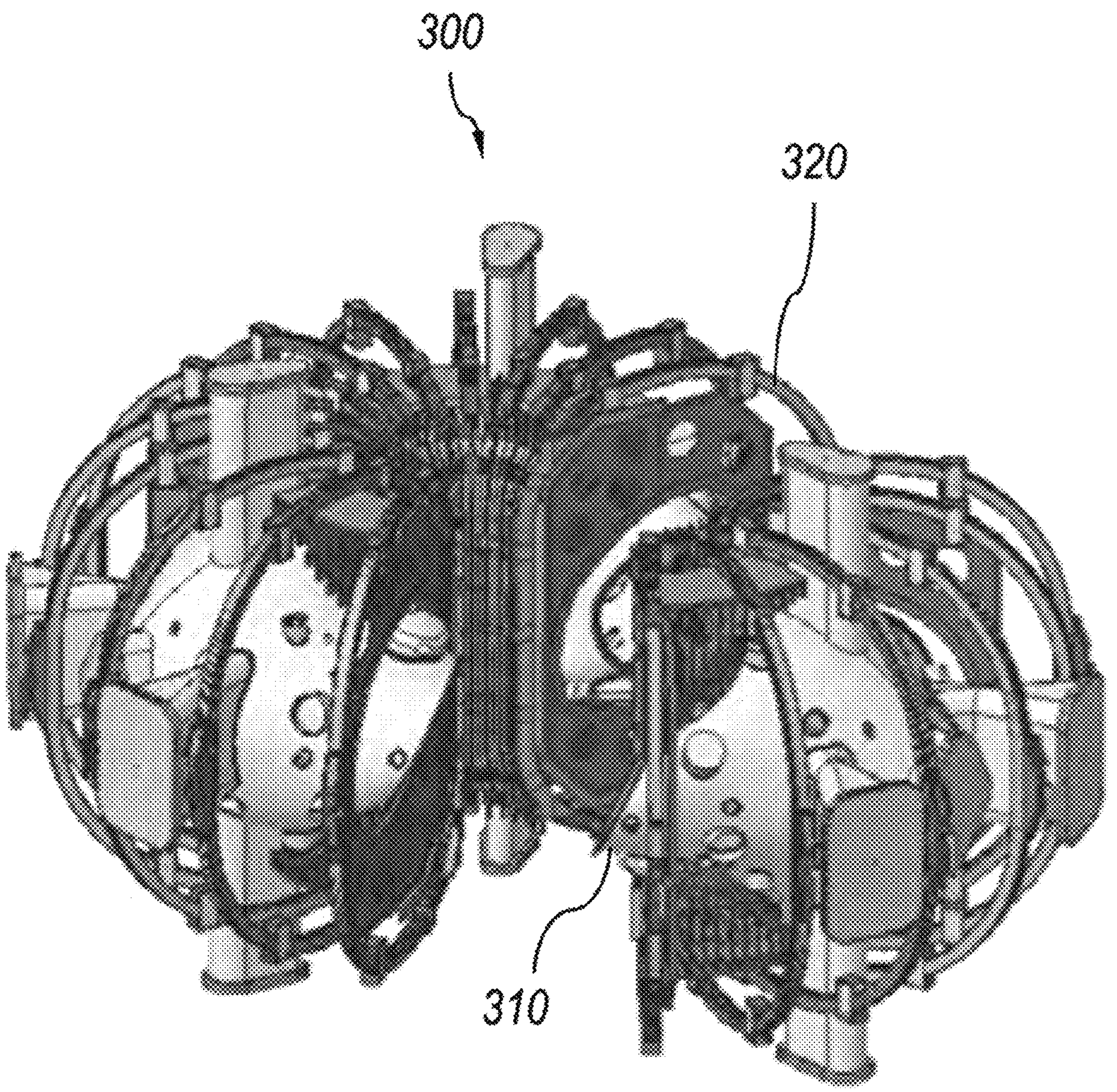
FIG. 3 is an image of a stellarator.
Figure 4:
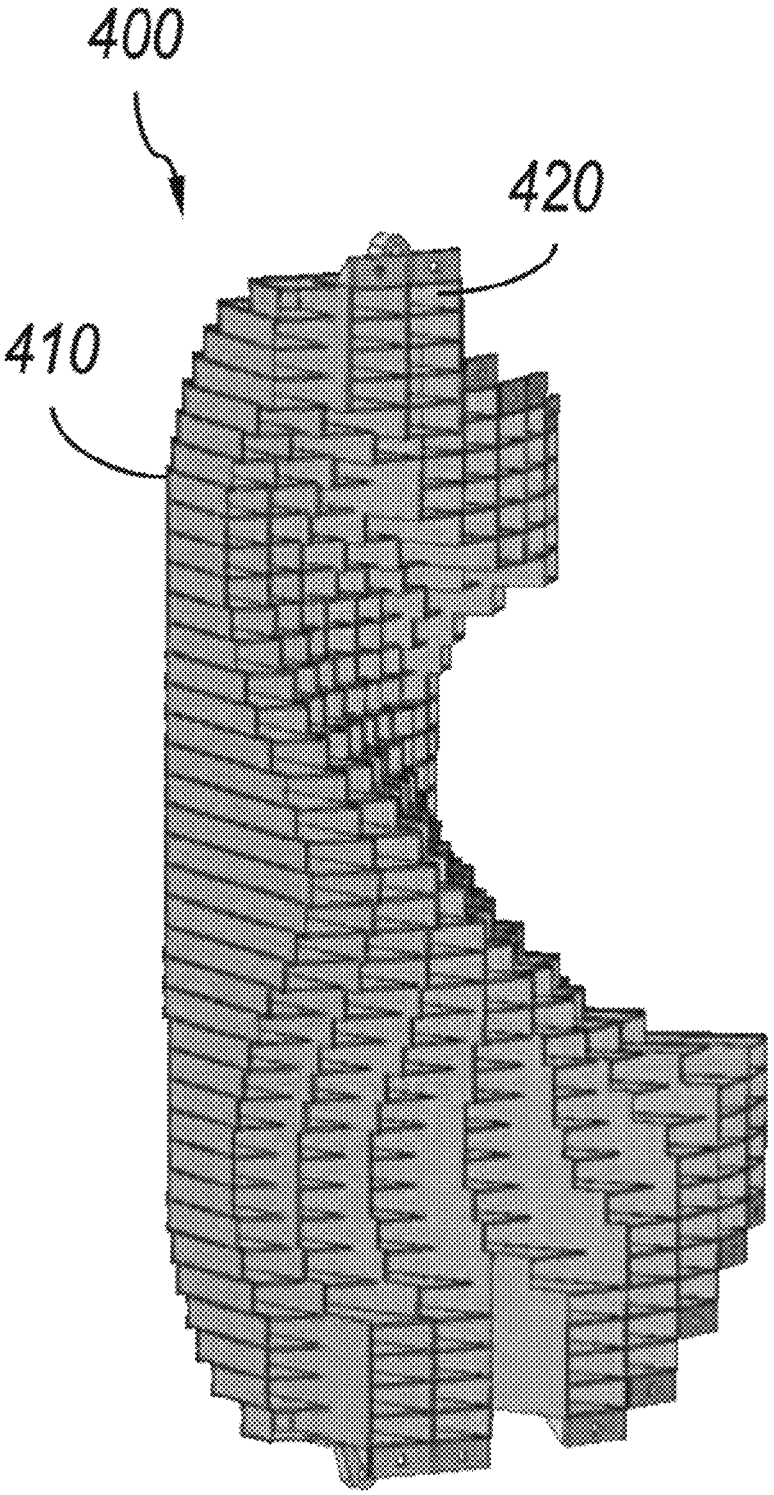
FIG. 4 is an illustration of a support structure for the stellarator.
Figure 5:
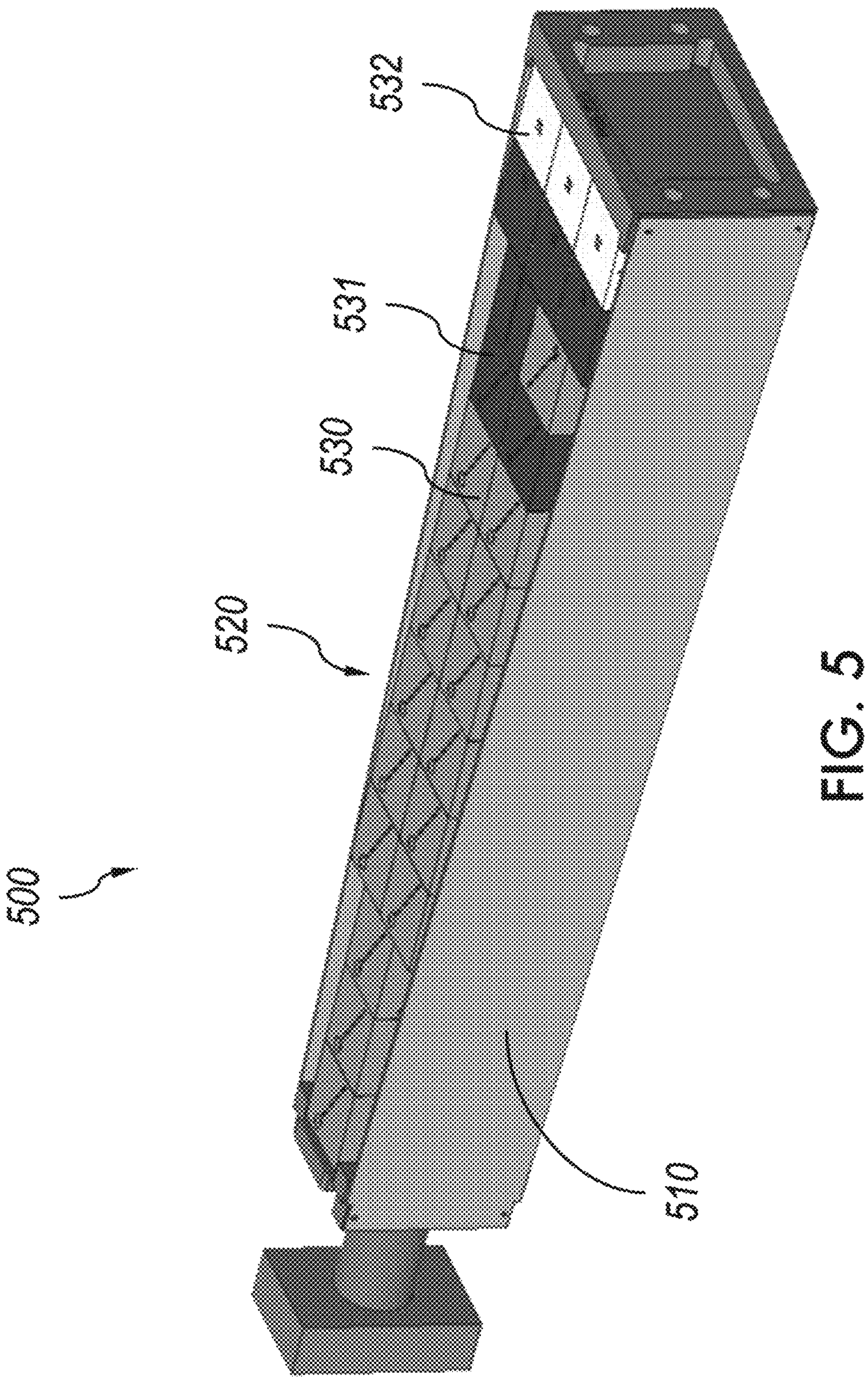
FIG. 5 is an illustration of a magnet casing containing a plurality of permanent magnets.

FIG. 3 depicts a stellarator 300 including a plurality of structural supports 310 and electromagnetic coils 320. As will be readily understood, the exact design of the structural supports 310 and the electromagnetic coils 320 will vary based on the parameters used during the design process. FIG. 4 illustrates an embodiment of a structural support 400 including a structure 410 defining a plurality of openings 420 extending therethrough. Each opening is configured to receive a magnet casing. FIG. 5 illustrates an embodiment of a magnet casing 500 with a top cover removed. The magnet casing comprises a casing body 510 defining a shaping unit 520 within an internal volume defined by the casing body. The shaping unit 520 comprises a plurality of magnets 530, 531, 532. In some embodiments, each of the plurality of magnets are removably fixed or adhered to one another. For instance, each one of the plurality of magnets may be epoxied to at least one other magnet. In some embodiments, the magnet casings are inserted into the openings, thereby coupling the shaping unit 520 to the structural support 400. In some embodiments the magnet arrangement is a design determined in accordance with the methods disclosed herein. In some embodiments, each magnet 530, 531, 532 has a defined magnet configuration.

In some embodiments, a number of different magnet configurations in the stellarator should be less than the total number of magnets. In some embodiments, there are between 1 and 6 total number of magnet polarization types in the stellarator. In some embodiments, there are between 2 and 5 total number of magnet polarization types in the stellarator. In some embodiments, the total number of magnet configurations in any given shaping unit is less than about 20%, less than about 15%, less than about 10%, or less than about 5% of the total number of magnets in the shaping unit. For example, referring to FIG. 5, there are two layers of magnets in the shaping unit, each layer having 25 magnets, and there are only three magnet polarization types (e.g., gray magnet 530, black magnet 531, and white magnet 532). 3/50=6%.

In some embodiments, at least portion of the shaping units in a stellarator comprises a single magnet polarization type.

In some embodiments, the stellarator may include a one or more structural supports, one or more electromagnetic coils (such as a plurality of electromagnetic coils) operably connected to the plurality of structural supports, and a plurality of shaping units operably connected to the plurality of structural supports. Each shaping unit may include a plurality of permanent magnets, each of which has a configuration selected from a set of available configurations. In some embodiments, the plurality of shaping units are free of electromagnets. In some embodiments, the set of available configurations includes a plurality of cubic magnets. In some embodiments, each cubic magnet has one of a set of 1-6 orientation angles.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications, and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

Additional Embodiments

Additional Embodiment 1. A method of defining an array of permanent magnets for a stellarator, comprising:

- obtaining an initial arrangement of a plurality of permanent magnets positioned around a plasma having a plasma surface;
- optimizing dipole moment magnitudes and dipole moment orientation angles of each permanent magnet of the plurality of permanent magnets in the initial arrangement to provide a revised arrangement of the plurality of permanent magnets, wherein the optimization of the dipole moment magnitudes and dipole moment orientation angles comprises:

generating an improved arrangement of the plurality of permanent magnets, wherein the improved arrangement is generated by computing a first numerical minimization of an error field on the plasma surface, where dipole moment magnitudes and dipole moment orientation angles are free and continuous parameters in the computation of the first numerical minimization, and where the dipole moment magnitude is constrained from exceeding a pre-defined maximum value, generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value;

defining a set of allowable dipole moment orientation angles; and setting the dipole moment orientation angles of each of the permanent magnets having the non-zero dipole moment magnitudes in the generated revised arrangement to one of the dipole moment orientation angles in the defined set of allowable dipole moment orientation angles to provide the array of permanent magnets.

Additional Embodiment 2. The method of additional embodiment 1, wherein the first numerical minimalization is selected from the group consisting of a Quasi-Newton algorithm, a gradient descent algorithm, and a Levenberg-Marquardt algorithm.

Additional Embodiment 3. The method of any one of the preceding additional embodiments, wherein the second numerical minimalization is selected from the group consisting of a Quasi-Newton algorithm, a gradient descent algorithm, and a Levenberg-Marquardt algorithm.

Additional Embodiment 4. The method of any one of the preceding additional embodiments, wherein the pre-defined value ranges from about 0.1 MA/m multiplied by the volume of the permanent magnet to about 10 MA/m multiplied by the volume of the permanent magnet.

Additional Embodiment 5. The method of any one of the preceding additional embodiments, wherein predetermined value ranges from about 0.1 MA/m multiplied by the volume of the permanent magnet to about 10 MA/m multiplied by the volume of the permanent magnet.

Additional Embodiment 6. The method of any one of the preceding additional embodiments, further comprising removing one or more of the permanent magnets having the zero moment magnitude.

Additional Embodiment 7. The method of additional embodiment 6, wherein the removing of the one or more magnets having the zero moment magnitude occurs prior to the setting of the dipole moment orientation angles of each of the permanent magnets having the non-zero dipole moment magnitudes.

Additional Embodiment 8. The method of additional embodiment 6, wherein the removing of the one or more magnets having the zero moment magnitude occurs after setting of the dipole moment orientation angles of each of the permanent magnets having the non-zero dipole moment magnitudes.

Additional Embodiment 9. The method of any one of the preceding additional embodiments, further comprising replacing one or more of the permanent magnets having the zero moment magnitude with non-magnetic filler material.

Additional Embodiment 10. The method of additional embodiment 9, wherein the replacing of the one or more permanent magnets having the zero moment magnitude occurs prior to the setting of the dipole moment orientation angles of each of the permanent magnets having the non-zero dipole moment magnitudes.

Additional Embodiment 11. The method of additional embodiment 11, wherein the replacing of the one or more permanent magnets having the zero moment magnitude occurs after setting of the dipole moment orientation angles of each of the permanent magnets having the non-zero dipole moment magnitudes.

Additional Embodiment 12. The method of any one of additional embodiments 9-11, wherein the non-magnetic filler material is non-conductive.

Additional Embodiment 13. The method of any one of additional embodiments 9-11, wherein the non-magnetic filler material comprises one or more polymers or co-polymers.

Additional Embodiment 14. The method of additional embodiment 13, wherein the one or more polymers or co-polymers are selected from polyethylene or polypropylene.

Additional Embodiment 15. The method of any one of the preceding additional embodiments, further comprising numerically updating the orientation angles for the error field.

Additional Embodiment 16. The method of additional embodiment 15, wherein the error field is numerically updated using a nonlinear integer programming algorithm.

Additional Embodiment 17. The method of any one of the preceding additional embodiments, further comprising storing any one of initial arrangements, improved arrangements, or revised arrangements in a non-transitory storage medium.

Additional Embodiment 18. A magnet array for a stellarator, wherein the magnet array comprises a plurality of permanent magnets and wherein the magnet array is designed using the method of any one of additional embodiments 1-17.

Additional Embodiment 19. The magnet array of additional embodiment 18, where each permanent magnet of the plurality of permanent magnets is selected from a set of predetermined permanent magnet types.

Additional Embodiment 20. The magnet array of additional embodiment 19, wherein a number of different permanent magnet types in the set of predetermined permanent magnet types is less than the total number of permanent magnets in the magnet array.

Additional Embodiment 21. The magnet array of additional embodiment 19, wherein a number of different permanent magnet types in the set of predetermined permanent magnet types ranges from 1 to 6.

Additional Embodiment 22. The magnet array of additional embodiment 19, wherein each predetermined permanent magnet type in the set of predetermined permanent magnet types has a predetermined shape and/or predetermined orientation angles.

Additional Embodiment 23. A non-transitory computer-readable medium storing instructions for defining an array of permanent magnets for a stellarator, comprising:

obtaining an initial arrangement of a plurality of permanent magnets positioned around a plasma having a plasma surface;

optimizing dipole moment magnitudes and dipole moment orientation angles of each permanent magnet of the plurality of permanent magnets in the initial arrangement to provide a revised arrangement of the plurality of permanent magnets, wherein the optimization of the dipole moment magnitudes and dipole moment orientation angles comprises:

generating an improved arrangement of the plurality of permanent magnets, wherein the improved arrangement is generated by computing a first numerical minimization of an error field on the plasma surface, where dipole moment magnitudes and dipole moment orientation angles are free and continuous parameters in the computation of the first numerical minimization, and where the dipole moment magnitude is constrained from exceeding a pre-defined maximum value, generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value;

defining a set of allowable dipole moment orientation angles; and setting the dipole moment orientation angles of each of the permanent magnets having the non-zero dipole moment magnitudes in the generated revised arrangement to one of the dipole moment orientation angles in the defined set of allowable dipole moment orientation angles to provide the array of permanent magnets.

Additional Embodiment 24. The non-transitory computer-readable medium of additional embodiment 23, wherein the first numerical minimalization is selected from the group consisting of a Quasi-Newton algorithm, a gradient descent algorithm, and a Levenberg-Marquardt algorithm.

Additional Embodiment 25. The non-transitory computer-readable medium of any one of additional embodiments 23-24, wherein the second numerical minimalization is selected from the group consisting of a Quasi-Newton algorithm, a gradient descent algorithm, and a Levenberg-Marquardt algorithm.

Additional Embodiment 26. The non-transitory computer-readable medium of any one of additional embodiments 23-25, wherein the pre-defined value ranges from about 0.1 MA/m multiplied by the volume of the permanent magnet to about 10 MA/m multiplied by the volume of the permanent magnet.

Additional Embodiment 27. The non-transitory computer-readable medium of any one of additional embodiments 23-26, wherein the predetermined value ranges from about 0.1 MA/m multiplied by the volume of the permanent magnet to about 10 MA/m multiplied by the volume of the permanent magnet.

Additional Embodiment 28. The non-transitory computer-readable medium of any one of additional embodiments 23-27, further comprising removing one or more of the permanent magnets having the zero moment magnitude.

Additional Embodiment 29. The non-transitory computer-readable medium of additional embodiment 28, wherein the removing of the one or more magnets having the zero moment magnitude occurs prior to the setting of the dipole moment orientation angles of each of the permanent magnets having the non-zero dipole moment magnitudes.

Additional Embodiment 30. The method of additional embodiment 28, wherein the removing of the one or more magnets having the zero moment magnitude occurs after setting of the dipole moment orientation angles of each of the permanent magnets having the non-zero dipole moment magnitudes.

Additional Embodiment 31. The non-transitory computer-readable medium of any one of additional embodiments 23-27, further comprising replacing one or more of the permanent magnets having the zero moment magnitude with non-magnetic filler material.

Additional Embodiment 32. The non-transitory computer-readable medium of additional embodiment 31, wherein the replacing of the one or more permanent magnets having the zero moment magnitude occurs prior to the setting of the dipole moment orientation angles of each of the permanent magnets having the non-zero dipole moment magnitudes.

Additional Embodiment 33. The non-transitory computer-readable medium of additional embodiment 31, wherein the replacing of the one or more permanent magnets having the zero moment magnitude occurs after setting of the dipole moment orientation angles of each of the permanent magnets having the non-zero dipole moment magnitudes.

Additional Embodiment 34. The non-transitory computer-readable medium of any one of additional embodiments 31-33, wherein the non-magnetic filler material is non-conductive.

Additional Embodiment 35. The non-transitory computer-readable medium of any one of additional embodiments 31-33, wherein the non-magnetic filler material comprises one or more polymers or co-polymers.

Additional Embodiment 36. The non-transitory computer-readable medium of additional embodiment 35, wherein the one or more polymers or co-polymers are selected from polyethylene or polypropylene.

Additional Embodiment 37. The non-transitory computer-readable medium of any one of additional embodiments 23-36, further comprising numerically updating the orientation angles for the error field.

Additional Embodiment 38. The non-transitory computer-readable medium of additional embodiment 37, wherein the error field is numerically updated using a nonlinear integer programming algorithm.

Additional Embodiment 39. The non-transitory computer-readable medium of any one of additional embodiments 23-38, further comprising storing any one of initial arrangements, improved arrangements, or revised arrangements in a non-transitory storage medium.

Additional Embodiment 40. A system for defining an array of permanent magnets for a stellarator, the system comprising: (i) one or more processors, and (ii) one or more memories coupled to the one or more processors, the one or more memories to store computer-executable instructions that, when executed by the one or more processors, cause the system to perform operations comprising:

obtaining an initial arrangement of a plurality of permanent magnets positioned around a plasma having a plasma surface;

optimizing dipole moment magnitudes and dipole moment orientation angles of each permanent magnet of the plurality of permanent magnets in the initial arrangement to provide a revised arrangement of the plurality of permanent magnets, wherein the optimization of the dipole moment magnitudes and dipole moment orientation angles comprises:

generating an improved arrangement of the plurality of permanent magnets, wherein the improved arrangement is generated by computing a first numerical minimization of an error field on the plasma surface, where dipole moment magnitudes and dipole moment orientation angles are free and continuous parameters in the computation of the first numerical minimization, and where the dipole moment magnitude is constrained from exceeding a pre-defined maximum value, generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value;

defining a set of allowable dipole moment orientation angles; and setting the dipole moment orientation angles of each of the permanent magnets having the non-zero dipole moment magnitudes in the generated revised arrangement to one of the dipole moment orientation angles in the defined set of allowable dipole moment orientation angles to provide the array of permanent magnets.

Additional Embodiment 41. The system of additional embodiment 40, wherein the first numerical minimalization is selected from the group consisting of a Quasi-Newton algorithm, a gradient descent algorithm, and a Levenberg-Marquardt algorithm.

Additional Embodiment 42. The system of any one of additional embodiments 40-41, wherein the second numerical minimalization is selected from the group consisting of a Quasi-Newton algorithm, a gradient descent algorithm, and a Levenberg-Marquardt algorithm.

Additional Embodiment 43. The system of any one of additional embodiments 40-42, wherein the pre-defined value ranges from about 0.1 MA/m multiplied by the volume of the permanent magnet to about 10 MA/m multiplied by the volume of the permanent magnet.

Additional Embodiment 44. The system of any one of additional embodiments 40-43, wherein the predetermined value ranges from about 0.1 MA/m multiplied by the volume of the permanent magnet to about 10 MA/m multiplied by the volume of the permanent magnet.

Additional Embodiment 45. The system of any one of additional embodiments 40-44, further comprising removing one or more of the permanent magnets having the zero moment magnitude.

Additional Embodiment 46. The system of additional embodiment 45, wherein the removing of the one or more magnets having the zero moment magnitude occurs prior to the setting of the dipole moment orientation angles of each of the permanent magnets having the non-zero dipole moment magnitudes.

Additional Embodiment 47. The system of additional embodiment 45, wherein the removing of the one or more magnets having the zero moment magnitude occurs after setting of the dipole moment orientation angles of each of the permanent magnets having the non-zero dipole moment magnitudes.

Additional Embodiment 48. The system of any one of additional embodiments 40-44, further comprising replacing one or more of the permanent magnets having the zero moment magnitude with non-magnetic filler material.

Additional Embodiment 49. The system of additional embodiment 48, wherein the replacing of the one or more permanent magnets having the zero moment magnitude occurs prior to the setting of the dipole moment orientation angles of each of the permanent magnets having the non-zero dipole moment magnitudes.

Additional Embodiment 50. The system of additional embodiment 48, wherein the replacing of the one or more permanent magnets having the zero moment magnitude occurs after setting of the dipole moment orientation angles of each of the permanent magnets having the non-zero dipole moment magnitudes.

Additional Embodiment 51. The system of any one of additional embodiments 48-50, wherein the non-magnetic filler material is non-conductive.

Additional Embodiment 52. The system of any one of additional embodiments 48-50, wherein the non-magnetic filler material comprises one or more polymers or co-polymers.

Additional Embodiment 53. The system of additional embodiment 52, wherein the one or more polymers or co-polymers are selected from polyethylene or polypropylene.

Additional Embodiment 54. The system of any one of additional embodiments 40-53, further comprising numerically updating the orientation angles for the error field.

Additional Embodiment 55. The system of additional embodiment 54, wherein the error field is numerically updated using a nonlinear integer programming algorithm.

Additional Embodiment 56. The system of any one of additional embodiments 40-55, further comprising storing any one of initial arrangements, improved arrangements, or revised arrangements in a non-transitory storage medium.

The invention claimed is:

1. A method of defining an array of permanent magnets for a stellarator, comprising:

obtaining an initial arrangement of a plurality of permanent magnets positioned around a plasma having a plasma surface;

optimizing dipole moment magnitudes and dipole moment orientation angles of each permanent magnet of the plurality of permanent magnets in the initial arrangement to provide a revised arrangement of the plurality of permanent magnets, wherein the optimization of the dipole moment magnitudes and dipole moment orientation angles comprises:

generating an improved arrangement of the plurality of permanent magnets, wherein the improved arrangement is generated by computing a first numerical minimization of an error field on the plasma surface, where dipole moment magnitudes and dipole moment orientation angles are free and continuous parameters in the computation of the first numerical minimization, and where the dipole moment magnitude is constrained from exceeding a pre-defined maximum value, generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value;

defining a set of allowable dipole moment orientation angles; and setting the dipole moment orientation angles of each of the permanent magnets having the non-zero dipole moment magnitudes in the generated revised arrangement to one of the dipole moment orientation angles in the defined set of allowable dipole moment orientation angles to provide the array of permanent magnets.

2. The method of claim 1, wherein the first numerical minimalization is selected from the group consisting of a Quasi-Newton algorithm, a gradient descent algorithm, and a Levenberg-Marquardt algorithm; and wherein the second numerical minimalization is selected from the group consisting of a Quasi-Newton algorithm, a gradient descent algorithm, and a Levenberg-Marquardt algorithm, and wherein the pre-defined value ranges from about 0.1 MA/m multiplied by the volume of the permanent magnet to about 10 MA/m multiplied by the volume of the permanent magnet.

3. The method of claim 1, further comprising (i) removing one or more of the permanent magnets having the zero moment magnitude; and/or (ii) replacing one or more of the permanent magnets having the zero moment magnitude with non-magnetic filler material.

4. A non-transitory computer-readable medium storing instructions for defining an array of permanent magnets for a stellarator, comprising:

obtaining an initial arrangement of a plurality of permanent magnets positioned around a plasma having a plasma surface;

optimizing dipole moment magnitudes and dipole moment orientation angles of each permanent magnet of the plurality of permanent magnets in the initial arrangement to provide a revised arrangement of the plurality of permanent magnets, wherein the optimization of the dipole moment magnitudes and dipole moment orientation angles comprises:

generating an improved arrangement of the plurality of permanent magnets, wherein the improved arrangement is generated by computing a first numerical minimization of an error field on the plasma surface, where dipole moment magnitudes and dipole moment orientation angles are free and continuous parameters in the computation of the first numerical minimization, and where the dipole moment magnitude is constrained from exceeding a pre-defined maximum value, generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value;

defining a set of allowable dipole moment orientation angles; and setting the dipole moment orientation angles of each of the permanent magnets having the non-zero dipole moment magnitudes in the generated revised arrangement to one of the dipole moment orientation angles in the defined set of allowable dipole moment orientation angles to provide the array of permanent magnets.

5. The non-transitory computer-readable medium of claim 4, wherein the first numerical minimalization is selected from the group consisting of a Quasi-Newton algorithm, a gradient descent algorithm, and a Levenberg-Marquardt algorithm; and wherein the second numerical minimalization is selected from the group consisting of a Quasi-Newton algorithm, a gradient descent algorithm, and a Levenberg-Marquardt algorithm.

6. The non-transitory computer-readable medium of claim 4, wherein the pre-defined value ranges from about 0.1 MA/m multiplied by the volume of the permanent magnet to about 10 MA/m multiplied by the volume of the permanent magnet.

7. The non-transitory computer-readable medium of claim 4, further comprising (i) removing one or more of the permanent magnets having the zero moment magnitude; and/or (ii) replacing one or more of the permanent magnets having the zero moment magnitude with non-magnetic filler material.

8. The non-transitory computer-readable medium of claim 7, wherein the non-magnetic filler material comprises one or more polymers or co-polymers.

9. The non-transitory computer-readable medium of claim 4, further comprising numerically updating the orientation angles for the error field, wherein the error field is numerically updated using a nonlinear integer programming algorithm.

10. A system for defining an array of permanent magnets for a stellarator, the system comprising: (i) one or more processors, and (ii) one or more memories coupled to the one or more processors, the one or more memories to store computer-executable instructions that, when executed by the one or more processors, cause the system to perform operations comprising:

obtaining an initial arrangement of a plurality of permanent magnets positioned around a plasma having a plasma surface;

optimizing dipole moment magnitudes and dipole moment orientation angles of each permanent magnet of the plurality of permanent magnets in the initial arrangement to provide a revised arrangement of the plurality of permanent magnets, wherein the optimization of the dipole moment magnitudes and dipole moment orientation angles comprises:

generating an improved arrangement of the plurality of permanent magnets, wherein the improved arrangement is generated by computing a first numerical minimization of an error field on the plasma surface, where dipole moment magnitudes and dipole moment orientation angles are free and continuous parameters in the computation of the first numerical minimization, and where the dipole moment magnitude is constrained from exceeding a pre-defined maximum value, generating the revised arrangement, wherein the revised arrangement is generated by computing a second numerical minimization of a composite cost function that penalizes both the error field on the plasma surface and intermediate dipole moment magnitudes, wherein the computation of the second numerical optimization uses the generated improved arrangement as an initialization, and wherein each magnet of the plurality of magnets in the revised arrangement has either a zero dipole moment magnitude or a non-zero dipole moment magnitude, and where the non-zero dipole moment magnitude has a predetermined value;

defining a set of allowable dipole moment orientation angles; and setting the dipole moment orientation angles of each of the permanent magnets having the non-zero dipole moment magnitudes in the generated revised arrangement to one of the dipole moment orientation angles in the defined set of allowable dipole moment orientation angles to provide the array of permanent magnets.

11. The system of claim 10, wherein the first numerical minimalization is selected from the group consisting of a Quasi-Newton algorithm, a gradient descent algorithm, and a Levenberg-Marquardt algorithm, and wherein the second numerical minimalization is selected from the group consisting of a Quasi-Newton algorithm, a gradient descent algorithm, and a Levenberg-Marquardt algorithm.

12. The system of claim 10, wherein the pre-defined value ranges from about 0.1 MA/m multiplied by the volume of the permanent magnet to about 10 MA/m multiplied by the volume of the permanent magnet.

13. The system of claim 10 further comprising removing one or more of the permanent magnets having the zero moment magnitude.

14. The system of claim 13, wherein the removing of the one or more magnets having the zero moment magnitude occurs prior to the setting of the dipole moment orientation angles of each of the permanent magnets having the non-zero dipole moment magnitudes.

15. The system of claim 10, further comprising replacing one or more of the permanent magnets having the zero moment magnitude with non-magnetic filler material.

16. The system of claim 15, wherein the replacing of the one or more permanent magnets having the zero moment magnitude occurs prior to the setting of the dipole moment orientation angles of each of the permanent magnets having the non-zero dipole moment magnitudes.

17. The system of claim 16, wherein the non-magnetic filler material comprises one or more polymers or co-polymers.

18. The system of claim 17, wherein the one or more polymers or co-polymers are selected from polyethylene or polypropylene.

19. The system of claim 10, further comprising numerically updating the orientation angles for the error field.

20. The system of claim 19, wherein the error field is numerically updated using a nonlinear integer programming algorithm.

* * * * *